July 3, 1962  C. L. BARKER, JR  3,041,741
SPACE FLIGHT SIMULATOR

Filed March 16, 1960  6 Sheets-Sheet 1

Fig. 1.

Charles L. Barker, Jr.
*INVENTOR.*

BY S. J. Rotondi
A. J. Dupont
Leonard Flank

July 3, 1962

C. L. BARKER, JR 3,041,741

SPACE FLIGHT SIMULATOR

Filed March 16, 1960

Charles L. Barker, Jr.
INVENTOR.

BY S. J. Rotondi
A. J. Dupont
Leonard Flank

July 3, 1962  C. L. BARKER, JR  3,041,741
SPACE FLIGHT SIMULATOR
Filed March 16, 1960  6 Sheets-Sheet 3

Charles L. Barker, Jr
INVENTOR.

July 3, 1962  C. L. BARKER, JR  3,041,741
SPACE FLIGHT SIMULATOR
Filed March 16, 1960  6 Sheets-Sheet 4

Charles L. Barker, Jr.,
*INVENTOR.*
BY S.J. Rotondi
A.J. Dupont
Leonard Flank July 3, 1962 C. L. BARKER, JR 3,041,741
SPACE FLIGHT SIMULATOR
Filed March 16, 1960 6 Sheets-Sheet 5

Charles L. Barker, Jr.,
INVENTOR.

July 3, 1962  C. L. BARKER, JR  3,041,741
SPACE FLIGHT SIMULATOR
Filed March 16, 1960  6 Sheets-Sheet 6

Charles L. Barker Jr,
INVENTOR.

United States Patent Office 3,041,741
Patented July 3, 1962

3,041,741
SPACE FLIGHT SIMULATOR
Charles L. Barker, Jr., Huntsville, Ala., assignor to the United States of America as represented by the Secretary of the Army
Filed Mar. 16, 1960, Ser. No. 15,507
22 Claims. (Cl. 35—12)
(Granted under Title 35, U.S. Code (1952), sec. 266)

The invention described herein may be manufactured and used by or for the Government for governmental purposes without the payment of any royalty thereon.

This invention relates to a space flight simulator. More particularly, the invention relates to a simulator which enables the imitation of acceleration and deceleration patterns of single and multistage rocket boosted flight vehicles. This simulator can provide a solution to the problem of the effects of acceleration and deceleration upon the human body and missile components. These effects hold the key to manned space flight.

To train a prospective astronaut, it is essential, among other things, that a condition of weightlessness be simulated so that the physiological and psychological effects on the human body can be evaluated and equipment devised and so located as to insure operation of a space vehicle by the astronaut while experiencing the unusual sensation of weightlessness under rigidly controlled conditions during an extended period of time. At present, the accepted mode of producing a condition of weightlessness is accomplished by piloting an aircraft through a series of intricate maneuvers so as to follow the Keplerian trajectory. Under the most ideal conditions, an aircraft is not the ideal vehicle for producing the condition of weightlessness due to the many variables involved in achieving the required flight pattern. Therefore, in the training of astronauts, there is a need for a flight simulator of a ground-based type capable of carrying personnel and equipment to provide training and research for future space flights under conditions which can be predetermined and rigidly controlled.

There is a still further need for a system which is capable of producing up to 30 seconds of a true zero-G (weightlessness) condition during a simulated missile flight and of producing up to 30 seconds or more of the subgravity conditions existing on some of the celestial bodies.

In view of these facts, an object of this invention is to provide a ground-based simulator capable of providing research data and of training personnel for future space flight.

Another object is to provide a simulator capable of duplicating single stage or multi-stage missile trajectories including injection and re-entry.

A further object of the invention is to provide a simulator capable of producing up to 30 seconds of a true zero-G (weightlessness) condition which will be experienced during a manned flight into outer space.

Another object is to provide a simulator which may be controlled for a gradual build-up of acceleration until a final desired acceleration is obtained.

A still further object is to provide a ground-based simulator having a low velocity track.

The foregoing and other objects of this invention will become more fully apparent from the following detailed description of the invention and from the accompanying drawings, in which:

FIGURE 6A is an elevational view of a detail of the mechanism shown in FIGURE 6.

FIGURE 11 is a sectional view, on an enlarged scale and partly broken away, taken along line 11—11 of FIGURE 10.

In the drawings, for the purpose of illustration there is shown a preferred embodiment of the invention and wherein the numeral 1 generally designates a space flight simulator. The simulator (FIGURE 1) includes a subsonic trackway comprising a horizontal circular track 2, a transition track 3, and a vertical track 4; a switch mechanism 5, a vehicle 6 and an emergency safety stop 7 disposed along the top portion of track 4.

Figure 9:
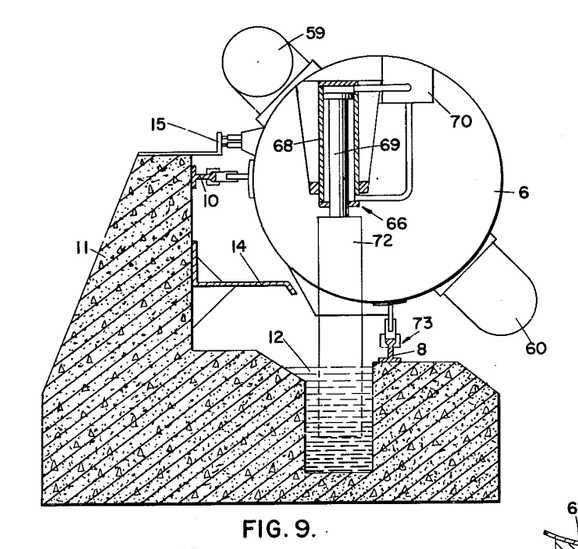
FIGURE 9 is a sectional view, on an enlarged scale, taken along line 9—9 of FIGURE 8 and showing the water brake of the vehicle and its operating mechanism.

The circular track 2 is preferably made of a reinforced concrete rail supporting structure 11 which carries a pair of rails 8 and 10. As best seen in FIGURE 9, the one rail 8 is arranged to extend in one plane and a second rail 10 lies in a plane displaced preferably 90° from the rail 8. The support structure 11 is provided with a continuous trough 12, adjacent the rail 8, which is filled with liquid, such as water, a splash shield 14 juxtaposed said second rail and extending in a direction over said trough and a continuous contact arm 15 carried by track 2 above shield 14 and similar arms carried on the connecting sections of tracks 3 and 4. Rails 8 and 10 each have movable sections 16 and 18 (FIGURES 2 and 3), respectively. Section 16 is adapted to pivot around hinge 19 (FIGURES 2 and 3) and section 18 is adapted to move along a guide surface 17 (FIGURES 3 and 4), so as to disconnect rails 8 and 10, respectively when transition rail sections 22 and 24 are connected between transition rails 26 and 28 and rails 8 and 10, respectively, of circular track 2.

Figure 1:
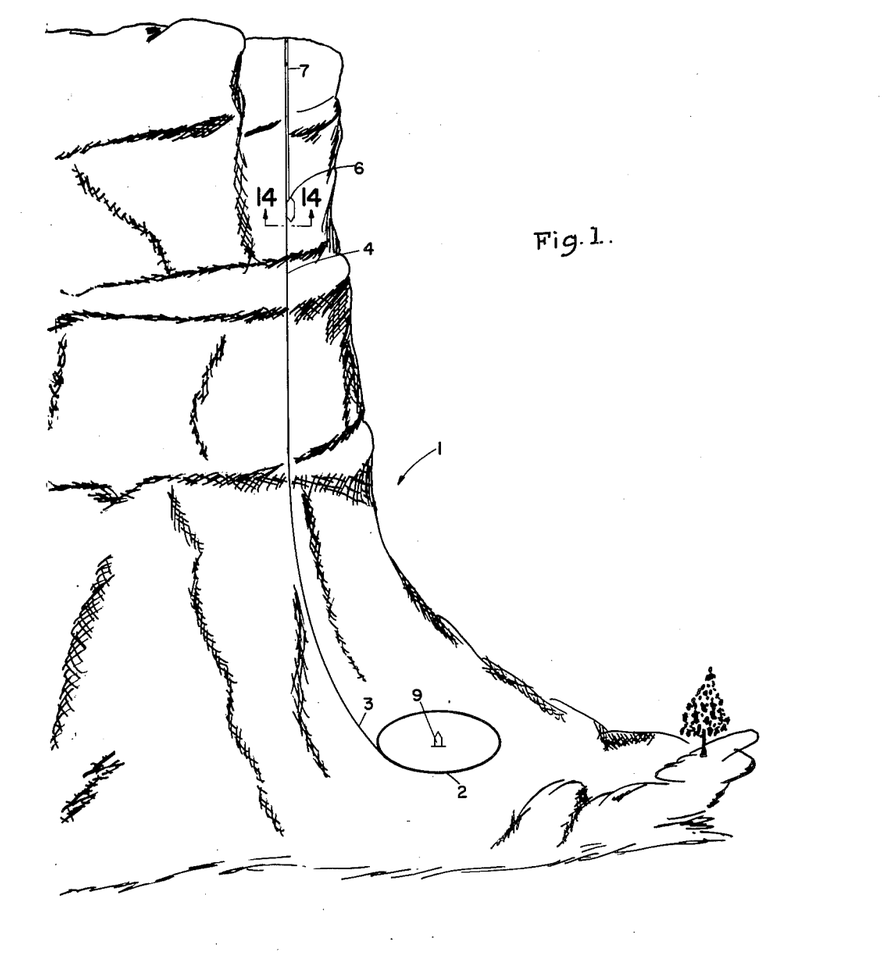
FIGURE 1 is a pictoral view of the space flight simulator showing part of the simulator's trackway positioned along the side of a mountain.

Removal of rail sections 16 and 18 and connection of section 22 between rails 8 and 26, and of section 24 between rails 10 and 28 is carried out by switching mechanism 5. The switching mechanism is designed to connect or disconnect the transition track and the circular track in a time period of substantially 5 seconds. The switching of the rails is simultaneously carried out by a single control (not shown) preferably located in a control house or blockhouse 9 (FIGURE 1).

Figure 2:
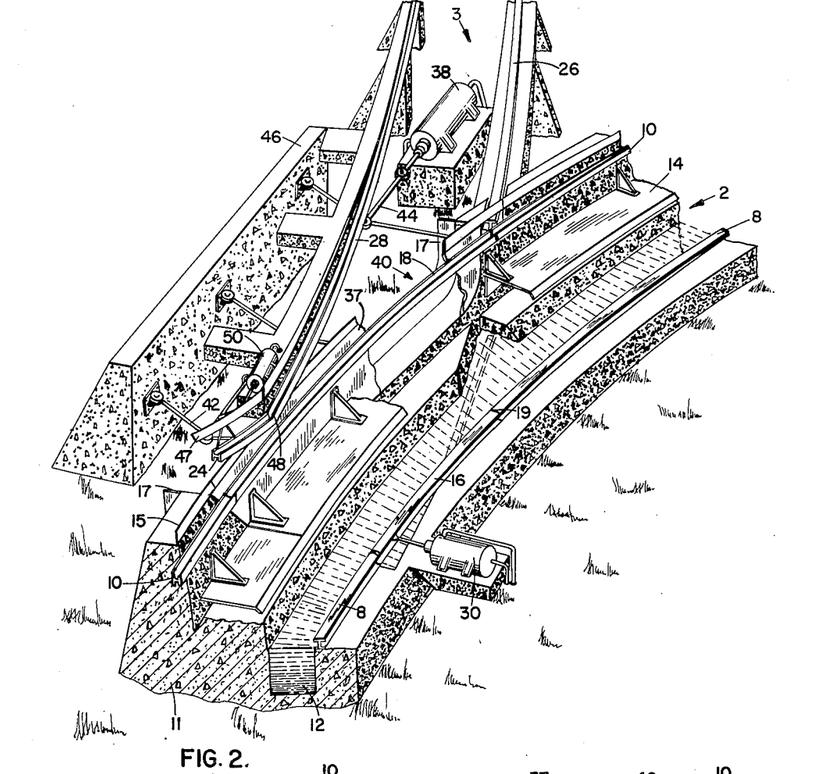
FIGURE 2 is a sectional view, partly broken away, of the trackway and the switching mechanism showing the switching mechanism in a position where the transition track is disconnected from the horizontal circular track.
Figure 2:
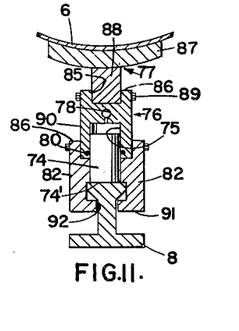
Figures 3, 5:
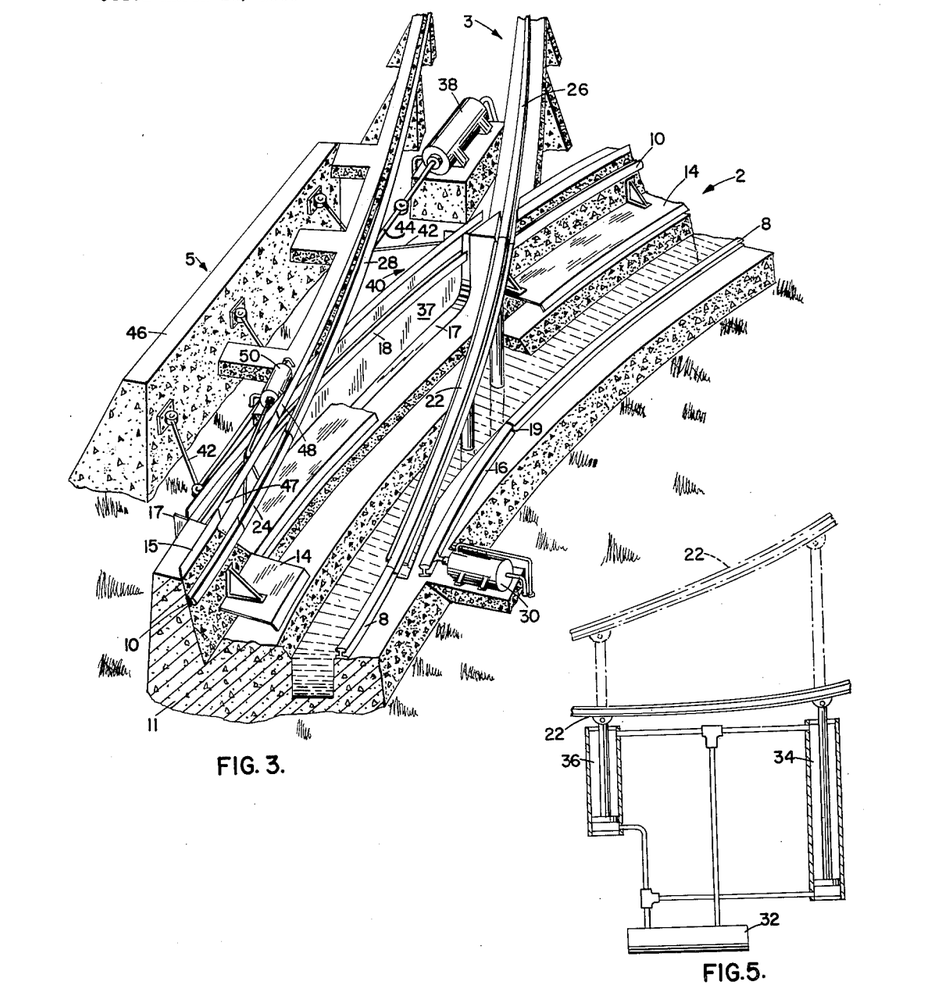
FIGURE 3 is a sectional view similar to FIGURE 2 but showing the switching mechanism moved to a position where the transition track is connected with the horizontal circular track and the circular track is open.
FIGURE 5 is an elevational view of the mechanism for connecting and disconnecting a section of one of the transition track rails.
Figure 6:
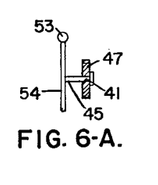
FIGURE 6 is an elevational view, partly broken away, of the mechanism for connecting and disconnecting a section of the other transition track rail.
Figure 7:
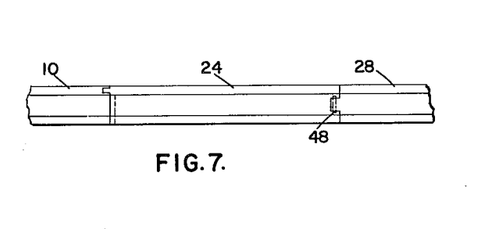
FIGURE 7 is a plan view showing the section of rail in FIGURE 6 in its position connecting the other transition rail to the corresponding circular rail.

When the switching mechanism 5 is actuated by the control switch (not shown) in blockhouse 9, rail section 16 is pivoted about hinge 19 by a fluid motor 30 or other suitable power means (FIGURES 2 and 3). Simultaneously, with the pivoting of section 16, transition rail section 22 is moved in an upward direction by pump 32 and fluid motors 34 and 36 (FIGURE 5) until section 22 connects rails 8 and 26. During this time, rail section 18, a portion of splash shield 14 and a portion of contact arm 15, which are connected to a movable section 37 (FIGURES 2, 3 and 4) of the circular track, are being moved along guide surface 17 by a fluid motor 38 having a reciprocable rod 44 connected by suitable linkage to a bridge mechanism 40. Simultaneously, with the movement of rail section 18, transition rail section 24 is being pivoted about hinge 48, by suitable connections to a fluid motor 50 (FIGURES 2, 3 and 6) whose piston rod 50¹ is pivotably connected at pivot 52 to one end of a rod 51. The other end of rod 51 is secured by a ball and socket joint 53, to one of the ends of a plurality of angularly related arms 54. The other ends of arms 54 are rigidly attached to rail section 24. Arms 54 also serve as a mount by means of a slot 41 in a contact arm section 47 and sliding pin 45 carried by one of the arms 54 and extending through a slot 41 (FIGURE 6A) for one end of a contact arm section 47 which connects circular track contact arm 15 and a contact arm 49 of the transition and vertical track to form an uninterrupted electrical conduit along the trackway of the simulator. The other end of section 47 is pivotably secured to hinge 43 (FIGURE 6). This arrangement allows motor 50 to operate rail 24 and section 47 together.

Figure 4:
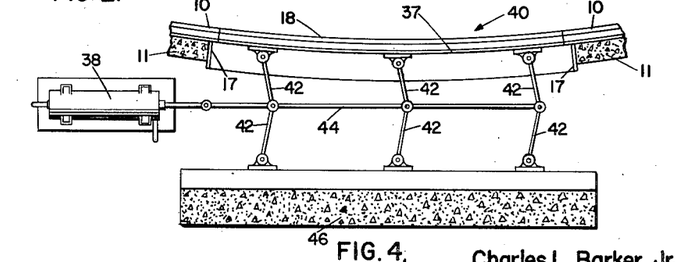
FIGURE 4 is a view showing a bridge mechanism for removing or replacing part of one rail of the circular track when the transition track is connected to or disconnected from the circular track.

The bridge mechanism 40 consists of a plurality of arms 42 disposed in parallel relation to one side of piston rod 44 (FIGURE 4). Each arm 42 has one end pivotably attached to track section 37 and its other end pivotably attached to piston rod 44. The arms 42 which are arranged in parallel relation on the opposite side of rod 44 each have one end pivotably attached to rod 44 and its other end pivotably attached to a stationary concrete member 46 of the circular track 2.

When the transition section is in the position shown in FIGURE 3, the circular track, transition track and the vertical track are connected to form a continuous trackway while the circular track is open at switch mechanism 5.

Preferably the horizontal circular track 2 has a 1,000 foot diameter, the arcuate transition track 3 begins with a 500 foot radius which opens out to 1200 feet at the beginning of the vertical track 4, which is approximately 3,700 feet in length, and is, as shown in FIGURE 1, preferably supported from the face of a precipitous natural terrain feature by suitable supporting structure (not shown). The choice of dimension for the different tracks was based upon size requirements for vehicles, acceleration requirement during boost and deceleration phases of flight (6 to 8 $g$), the acceleration value (20 $g$) that human personnel are capable of enduring, time necessary for safely operating the switching mechanism, and keeping power and velocity requirements as low as possible.

Figure 8:
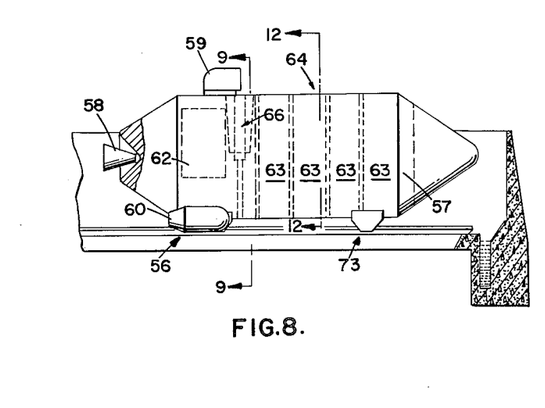
FIGURE 8 is an elevational view, partly broken away, showing the vehicle or sled positioned on a portion of the circular track.

The circular trackway 2, with the 1,000 foot diameter, meets these requirements, since it has a capability of 20 $g$ with a subsonic velocity of about 400 miles-per-hour. A further example of the advantage of the size of the circular track is seen from the power application of .08 $g$ resulting in a velocity of approximately 300 feet per second and a resultant acceleration of approximately 5.68 $g$ if applied for 116.5 seconds. This is made possible by taking advantage of centrifugal force, which makes it easy to produce high acceleration resultants with low power requirements. The length of the vertical trackway 4 was determined by the duration of weightlessness (30 seconds) that could possibly be obtained from the velocity of 483 feet per second along the vertical trackway. A longer vertical trackway could be used if desired but in such case a power increase would be generally required for achieving similar performance of weightlessness over a longer time period. The size of the vehicle will be a factor in determining propulsion requirements. The vehicle's propulsion is provided by a sustainer unit 56 and a booster unit 58 (FIGURE 8). The sustainer unit may be either a turbo-jet (as shown in FIGURE 8) or a rocket engine. However, the power supply used is so mounted as to be capable of applying thrust in either direction while the vehicle is moving.

In the event that the turbo-jet power plant is used, the change in direction of thrust application may be accomplished by an intake cone 59 and exhaust cone 60, both of which are rotatably mounted on the vehicle as shown in FIGURES 8 and 9. The exhaust cone is capable of rotation through 180° for changing the thrust direction. If the rocket engine is used, the small rocket could be completely rotated when vehicle direction changes are desired.

The booster thrust may be accomplished by a re-useable jato, or a pair of jato units, pivotably attached to one end of the vehicle (FIGURE 8). The booster thrust may be actuated by a signal from the blockhouse, through suitable electrical connections with the vehicle through spring loaded contacts 55 (FIGURE 13), upon entry and re-entry into the transition track.

The configuration of the vehicle is preferably circular in cross section with a bullet-shaped front and rear section (FIGURE 8). The front section of the vehicle houses an instrumentation section 57 which is externally connected by the spring loaded contacts 55, to contact arm 15. The rear section houses the fuel tank 62 for the sustainer and booster unit 58. The body portion intermediate the two end sections is provided with a compartment 64, adjacent the instrumentation section, for use by personnel utilizing form-fitted cradles 63 (FIGURE 12) that may move around both the longitudinal and the transverse axes of the vehicle to assure that the personnel are subjected to the resultant acceleration. A fluid brake assembly 66 (FIGURE 9) carried by the body portion adjacent the sustainer, is employed to subject the personnel in the vehicle to desired acceleration changes on the circular track 2.

The fluid brake assembly 66 comprises a reversible fluid motor 68, flow-connected to a source of fluid 70. The motor and source of fluid are secured to the inside wall of the vehicle 6 by any suitable means. The outer end of the motor's piston rod 69 is secured to one end of a flat brake arm or paddle 72. The other end of paddle 72 is adapted to be extended through a suitable opening in the wall of the vehicle and into trough 12 when motor 68 is actuated. It will be apparent that the further the paddle 72 is lowered into the water of the trough 12, the greater the resultant braking effect on the vehicle 6.

Figure 10:
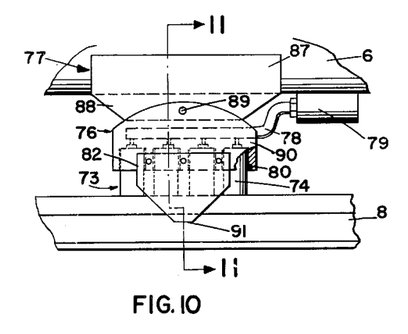
FIGURE 10 is an elevational view, partly broken away, showing the shoe mechanism used in mounting the vehicle on the rails.

To secure the vehicle 6 to the trackway of the simulator 1, there is provided spaced pairs of spaced shoe assemblies 73 (FIGURES 9, 10 and 11) carried by the vehicle for operative attachment of one pair of assemblies with a respective one of the right angularly disposed rails of the trackway. Each of the assemblies comprises a plurality of shoes 74 arranged for reciprocation in parallel bores 75 and through a fluid seal 80 provided in a member 76 disposed above the corresponding rail upon which one end 74¹ of the shoes will ride. The member 76 has a cut-out portion 85 centrally intermediate its upper end 86 and opening through the upper end. A cradle 77 has its arcuate cross piece 87 secured to the vehicle 6 (FIGURE 11) and the free end of its leg 88 received within the cut-out portion 85. A bolt 89 secures the member 76 to the leg 88 of the cradle. The lower end of member 76 defines a header 90 communicating with the bores 75 and connected to one end of a fluid conduit 78. The conduit 78 is connected at its other end to a source 79 (FIGURE 10) of fluid under pressure. The header 90, conduit 78 and the fluid supply 79 along with the bores 75 constitute a closed fluid system. The member 76 is maintained with shoes 74 in contact with its cooperating rail of the trackway by a pair of plates 82 attached at their upper ends in opposing relation to opposite sides of the member 76 (FIGURE 11). The lower ends 91 are formed with inwardly directed tongues 92 loosely engaging the web of the associated rail.

Due to the closed fluid system in which the shoes 74 are disposed, the shoes will maintain a constant pressure upon the adjacent rail surface to enable the shoes to follow the curvature, and any slight variations, of the rail since the shoes will reciprocate to varying relative positions matching the curvature of the rail.

In the operation of the invention, the characteristics of the flight to be simulated are calculated and their results charted. For example, if we refer to FIGURE 16 we see that a longitudinal acceleration of .08 $g$ applied against a vehicle on a track having a 500 foot radius will provide a resultant acceleration of approximately 5.68 $g$ after application for a period of 116.5 seconds. This high $g$ obtainable from application of a low $g$ is made possible by the centrifugal force developed due to the circular track.

Figure 17:
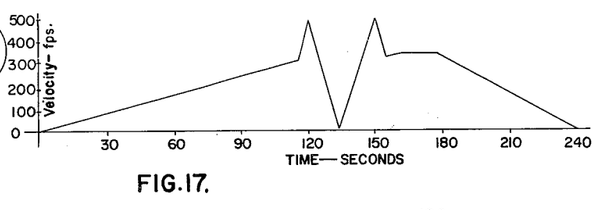
FIGURE 17 is a graph indicating the velocity (feet per second) as plotted against time (seconds) for the simulated flight of the vehicle as plotted in FIGURE 16.

FIGURE 17 shows that during this period the vehicle will reach a velocity of approximately 300 feet per second (on the circular track). Since a velocity of 483 feet per second is needed, at the base of the vertical track, to provide a period of 30 seconds of zero-G (weightlessness) the velocity of the vehicle must be increased before entering onto the vertical track where the condition of weightlessness is achieved.

This increase in velocity is supplied by the booster during the period that the vehicle is passing over the transition track. Therefore, the combination of the sustainer (.08 $g$) and the booster will provide an acceleration of 6 $g$ and a velocity of 483 feet per second after application for a period of 120 seconds prior to the vehicle reaching the vertical track.

Figure 12:
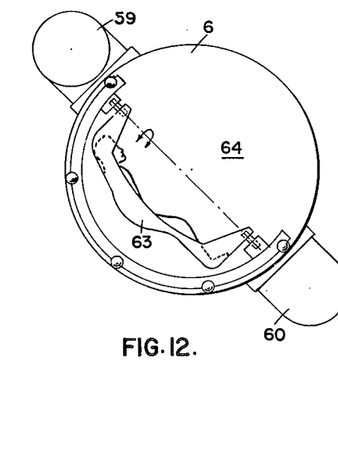
FIGURE 12 is an enlarged sectional view taken along line 12—12 of FIGURE 8, showing a suitable cradle arrangement within the vehicle.

With this information charted, personnel or components are secured in cradles 63 inside vehicle 6. The .08 $g$ longitudinal force is applied by the vehicle's sustainer and over a period of 116.5 seconds and the vehicle reaches an acceleration of approximately 5.68 $g$ and a velocity of approximately 300 feet per second. As vehicle 6 passes the switching mechanism 5, the mechanism is actuated from blockhouse 9 to connect the transition track to the circular track. With the two tracks connected, the vehicle enters the transition track instead of completing its rotation of track 2.

Figure 13:
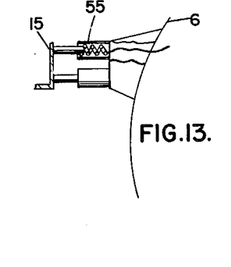
FIGURE 13 is an enlarged detailed sectional view of the electrical connector carried by the vehicle.

As the vehicle enters transition track 3, a second signal is sent from the blockhouse through contacts 55 to the instrumentation section 57 of the vehicle, this signal could also be programmed from the vehicle if desired, where it actuates booster 58. The booster is designed to give the increase in velocity, in this example enough to increase the velocity to 483 feet per second, that is necessary to allow the vehicle to leave the transition track and enter the vertical track at a velocity consistent with track length and weightlessness time desired.

When the vehicle enters the vertical track on its upward flight the booster stops operating; but the sustainer continued to operate. Since the entry into the vertical flight is tangential to the transition track, the acceleration due to centrifugal force drops to zero. Therefore during the remainder of the upward flight and during the subsequent downward flight to the transition track weightlessness occurs since the sustainer operates to balance the aerodynamic drag and friction forces tending to hold back the vehicle. The sustainer thrust is controlled by an accelerometer, located in the instrumentation section, which insures that the thrust vector is properly oriented to maintain zero-G within the tolerance of the accelerometer. The accelerometer maintains this control of swiveling the exhaust nozzle, so as to vary the thrust vector.

Figure 16:
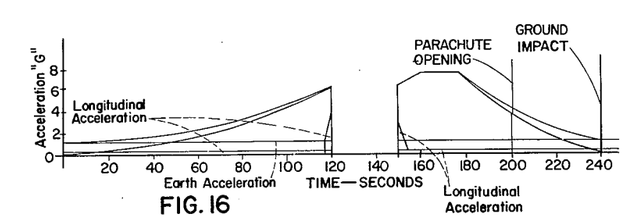
FIGURE 16 is a graph indicating the acceleration ($g$) as plotted against time (seconds) for a simulated flight of the vehicle.

During the upward and downward flight over the vertical track the vehicle would remain in a weightless state for 30 seconds (15 seconds up and 15 seconds down) or until it re-enters the transition track where it is slowed by a jato unit or units controlled by the accelerometer to a velocity of approximately 300 feet per second if re-entry is to be matched with the booster. However, as shown in FIGURE 16 the simulation of parachutes opening and ground impact may be accomplished by high impulse short duration rockets.

Other flight simulations may be carried out by the application of proper maneuvers. For example, the water brake may be utilized for simulating separation which occurs with multi-stage missiles. Also, an acceleration higher than 6 $g$ may be obtained on the circular track and a braking maneuver applied before the vertical track is entered. This simulation would give the researcher a basis of study of a high preweightlessness followed by weightlessness.

During the flight described above, personnel on board the vehicle would be subjected to the same action obtainable from a missile making a free flight. These actions can be viewed by an instructor, who takes the simulated flight with the students or they may be viewed by a television monitoring system connecting the personnel compartment with the blockhouse. Also, sounds may be introduced inside the personnel compartment through contact 55 to provide realism. Therefore, future astronauts may be trained to become familiar with and overcome the problems that they will be subjected to in future manned flights.

Figure 14:
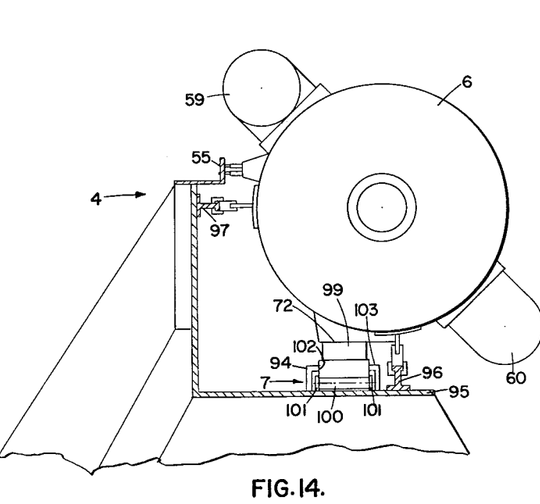
FIGURE 14 is an enlarged sectional view taken along line 14—14 of FIGURE 1, showing the safety stop coacting with the vehicle.
Figure 15:
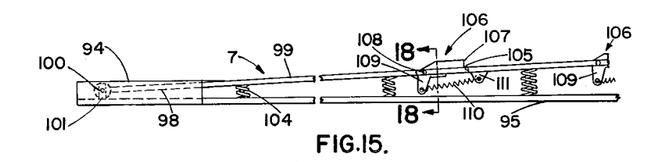
FIGURE 15 is an enlarged detailed view of the safety stop shown in FIGURE 14 and partly broken away intermediate its ends to indicate an indeterminate length.

While in normal operation, the vehicle 6 in its ascending flight will be programmed to stop short of the top of the vertical track 4, it is possible, due to overpowering, that the vehicle may overrun the length of the vertical track. Or it may be desirable to stop the vehicle at the top of the vertical track for purposes of conducting various tests. To prevent overrunning or to purposely stop and hold the vehicle 6 at the top of track 4, there is provided the safety brake assembly 7 (FIGURES 1, 14 and 15). The arrangement of the brake assembly includes a housing 94 carried on a base plate 95 disposed adjacent to and extending longitudinally along a rail 96 of the vertical track 4 (FIGURE 14). Rail 96 is a continuation of rail 26 of the transition track 3 while the other rail 97 of the vertical track is a continuation of the transition track rail 28. The housing 94 encloses one end 98 of a resilient, elongate arm 99. The end 98 is pivotally mounted within the housing 94 on a pivot pin 100 rotatably supported between spaced pivot support plates 101 upstandingly mounted on the base plate 95. The arm 99 is of some considerable length, preferably 20 feet or more, and inclines with respect to the base plate 95 as it recedes from its pivoted end 98 through an opening 102 in the roof 103 of the housing. In the space between the arm 99 and base plate 95, a plurality of coil springs 104 of successively greater length are secured at their opposite ends to the underside of the arm and the top of the base plate with the spring 104 of shortest length being closest to the pivoted end 98 of the arm. As the vehicle 6 enters the portion of the track 4 along which the safety stop 7 is positioned, the water brake paddle 72 contacts the upper surface of the resilient arm 99. As the vehicle continues to travel upwardly over the brake assembly 7, an increasingly greater frictional engagement is effected between the paddle and the brake arm to cause the vehicle to come to a full stop before traveling the full extent of the vertical track.

Figure 18:
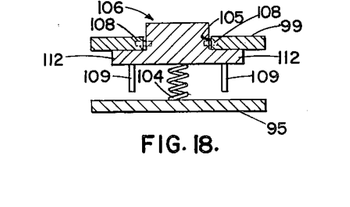
FIGURE 18 is a sectional view taken along line 18—18 of FIGURE 15.

In order to hold the vehicle 6 along the top of the vertical track, the arm 99 has a series of longitudinally spaced openings 105 transversely therethrough. A spring urged latch tooth 106 is pivotally mounted in each of the openings 105 so that a catch portion 107 thereof projects above the upper surface of the arm 99. The latch tooth 106 is mounted to pivot about pins 108 secured in opposite sides of openings 105. Each latch tooth 106 has a pair of parallel ears 109 depending therefrom. One end of a tension spring 110 is secured to each of the ears 109 and has its other end secured in respective one of a pair of depending plates 111 carried by the arm 99 as shown in FIGURE 15. The springs 110 urge each tooth with which they are associated to pivot about pins 108 so that the lower, outwardly extending flange portions 112 (FIGURE 18) of each tooth will engage with lower surface of the arm 99 to prevent further pivotal movement of the tooth in the one direction.

Thus, as the paddle 72 (FIGURE 14) passes across the arm 99, successive ones of the latches 106 will be rotated to have their catch portions 107 retract into the respective openings 105, against the effort of springs 110, allowing uninterrupted movement of the paddle on the arm. The tooth will be again rotated into its original position by the resilient effort of springs 110 after the paddle had passed over the tooth. When the vehicle is brought to a halt by action of the brake assembly 7, the paddle will engage against the catch portion 107 of the last latch tooth that it had passed over. This engagement will hold the vehicle stationary on the vertical track. To release the vehicle for downward flight, it is merely necessary to actuate the hydraulic mechanism and lift the paddle a sufficient distance to clear the top of the engaging latch tooth. To overcome any friction between the paddle and the arm 99 tending to hold the vehicle stationary, one of the power units of the vehicle can be used to overcome the frictional engagement. It is to be understood that the paddle will protrude a sufficient distance below the vehicle body so that it will be engageable with the safety brake assembly 7 and yet will be above the level of the liquid in the trough of the circular track 2. Also, the operation of the paddle can be accomplished by an occupant of the vehicle or may be remotely controlled from the blockhouse 9.

It is to be understood that the form of the invention that is herein shown and described is the preferred embodiment, and that various changes in the shape, size and arrangement of parts may be resorted to without departing from the spirit of the invention, or the scope of the subjoined claims.

I claim:

1. A space flight simulator for producing a condition of weightlessness which will be experienced during a manned flight into outer space comprising a trackway having a continuous circular track lying in one plane, another track disposed in a plane substantially vertically related to said one plane, a transition track connecting said another track and adapted to be connected tangentially to said circular track, a vehicle disposed for movement over said trackway, means for controlling movement of said vehicle, and means to propel said vehicle over said trackway at velocities sufficient to produce a condition of weightlessness within said vehicle during selected periods of movement of said vehicle over said another track.

2. A space flight simulator for producing a condition of weightlessness which will be experienced during a manned flight into outer space comprising a continuous track lying in one plane, a second track disposed in a plane substantially vertically related to said one plane, a transition track connected at one end to said second track and having a movable end section at its other end adapted for attachment to said continuous track; switching means for said section of said transition track for connecting and disconnecting said section of said transition track to said continuous track; a vehicle disposed adjacent said tracks; a plurality of rail shoe assemblies carried by said vehicle for connecting said vehicle to said tracks; means for controlling movement of said vehicle, means for slowing down said vehicle, and means to propel said vehicle over said tracks at velocities sufficient to produce a condition of weightlessness within said vehicle during selected periods of movement of said vehicle over said second track.

3. A device as set forth in claim 2, in which said continuous track is circular.

4. A device as set forth in claim 2, in which said second track comprises a first rail lying in one plane and a second rail disposed in a plane angularly related to said first rail.

5. A device as set forth in claim 4, in which there is provided a safety stop adjacent the top of said second track and comprising a resilient arm having one end pivotably connected to said second track adjacent said first rail, and a plurality of spaced-apart resilient members of varying length, each of said resilient members having one end connected to said arm and the other end connected to said second track.

6. A device as set forth in claim 4 wherein said resilient members are arranged in successively increasing lengths along the longitudinal extent of said arm from said one end thereof to adjacent the other end thereof.

7. A device as set forth in claim 2, in which said transition track is comprised of sections forming an arc of varying radius, said tracks having a first rail lying in one plane and a second rail disposed in a plane angularly related to said first rail, whereby said continuous track is connected to said second track by said transition track when the sections of the transition track are joined to form said arc.

8. A device as set forth in claim 2, in which said means for controlling movement of said vehicle comprises; a control house having controls therein; an instrumentation section positioned in said vehicle, and means connecting said instrumentation section and said controls.

9. A space flight simulator comprising a continuous circular track lying in one plane; a second track disposed in a plane angularly related to said one plane; a transition track connected at one end to said second track and having a movable end section at its other end adapted for attachment to said continuous track; switching means for said section of said transition track for connecting and disconnecting said section of said transition track to said continuous track; a vehicle disposed adjacent said tracks; a plurality of rail shoe assemblies carried by said vehicle for connecting said vehicle to said tracks; means for controlling movement of said vehicle and means for slowing down said vehicle, said circular track comprising a first rail lying in one plane; a second rail disposed in a plane angularly related to said first rail, a contact arm connected to said track adjacent said second rail; said means for slowing down said vehicle including a brake arm carried by said vehicle and adapted to extend from said vehicle, a circular trough positioned intermediate said rails and adjacent said first rail, liquid for receiving said brake arm filling said trough, and a splash shield having one edge carried by said circular track beneath said second rail and having a second end extending to a point over said trough, whereby said liquid is prevented from leaving the vicinity of said track.

10. A space flight simulator comprising a continuous track lying in one plane; a second track disposed in a plane angularly related to said one plane; a transition track connected at one end to said second track and having a movable end section at its other end adapted for attachment to said continuous track; switching means for said section of said transition track for connecting and disconnecting said section of said transition track to said continuous track; a vehicle disposed adjacent said tracks; a plurality of rail shoe assemblies carried by said vehicle for connecting said vehicle to said tracks; means for controlling movement of said vehicle and means for slowing down said vehicle, said transition track being comprised of sections forming an arc of varying radius, said tracks having a first rail lying in one plane and a second rail disposed in a plane angularly related to said first rail, whereby said continuous track is connected to said second track by said transition track when the sections of the transition track are joined to form said arc, said continuous track having disconnectable section, said switching means comprising means for disconnecting a first section of said continuous track, means for simultaneously connecting a first part of said transition track to said continuous track, means for disconnecting a second section of said continuous track simultaneous with the disconnecting of said first section and means operating simultaneously with said other means for connecting a second part of said transition track to said continuous track.

11. A space flight simulator comprising a continuous track lying in one plane; a second track disposed in a plane angularly related to said one plane; a transition track connected at one end to said second track and having a movable end section at its other end adapted for attachment to said continuous track; switching means for said section of said transition track for connecting and disconnecting said section of said transition track to said continuous track, a vehicle disposed adjacent said tracks; a plurality of rail shoe assemblies carried by said vehicle for connecting said vehicle to said tracks; means for controlling movement of said vehicle and means for slowing down said vehicle, said vehicle comprising a body having a circular cross section and bullet-shaped ends; an instrumentation section in one end of said body; a personnel compartment adjacent said last named-end; a water brake assembly juxtaposed said compartment; a sustainer motor adjacent said water brake; a fuel tank positioned next to said sustainer in a part of the other end of said body, and a booster disposed in the remainder of said last-named end.

12. A device as set forth in claim 11, in which said personnel compartment contains a plurality of personnel carrying cradles disposed for movement about two different axes, whereby the personnel will always be subjected to the resultant acceleration.

13. A device as set forth in claim 11, in which said sustainer comprises a rotatable exhaust cone whose movement is controlled by said instrumentation section.

14. A device as set forth in claim 11, in which said booster is pivotably mounted in said other end of said body.

15. A device as set forth in claim 14, in which pivoting of said booster is controlled from said instrumentation section of said body.

16. A space flight simulator comprising a continuous track lying in one plane; a second track disposed in a plane angularly related to said one plane; a transition track connected at one end to said second track and having a movable end section at its other end adapted for attachment to said continuous track; switching means for said section of said transition track for connecting and disconnecting said section of said transition track to said continuous track; a vehicle disposed adjacent said tracks; a plurality of rail shoe assemblies carried by said vehicle for connecting said vehicle to said tracks; means for controlling movement of said vehicle and means for slowing down said vehicle, said plurality of rail shoe assemblies each comprising a cradle carried by the vehicle; a member having one end secured to said cradle; a plurality of spaced shoes mounted for reciprocation in said member and each having one end extending therefrom and engaging the adjacent surface of an associated track; a source of operating power connected to said member for imparting relative reciprocatory movement to said shoes; a pair of plates, each plate having one end secured to the other end of said member and a pair of oppositely related tongues carried adjacent a second end of said plates and loosely engaging a part of said associated track, whereby said one ends of said shoes are retained in contact with said rail as the contour of the track varies.

17. A space flight simulator comprising a continuous track lying in one plane; a second track disposed in a plane angularly related to said one plane; a transition track connected at one end to said second track and having a movable end section at its other end adapted for attachment to said continuous track; switching means for said section of said transition track for connecting and disconnecting said section of said transition track to said continuous track; a vehicle disposed adjacent said tracks; a plurality of rail shoe assemblies carried by said vehicle for connecting said vehicle to said tracks; means for controlling movement of said vehicle and means for slowing down said vehicle, said means for slowing said vehicle comprising a reversible motor secured inside the body of said vehicle; means for providing power for said motor; a rod disposed for actuation by said motor; a brake arm having one end secured to said rod and a second end extending through the body of said vehicle; a trough disposed beneath said last-named end and fluid retained by said trough, whereby said last-named end of said brake arm is selectively movable into contact with said fluid when said motor is actuated in one direction and out of contact with said fluid when said motor is reversed.

18. A device as set forth in claim 17 in which there is provided a safety stop adjacent the top of the second track and in which said brake arm is disposed for coaction with said safety stop whereby said vehicle is prevented from overshooting the second track.

19. A space flight simulator comprising a trackway having a continuous track lying in one plane, a second track disposed in a plane angularly related to said one plane, and an arcuate transition track connecting said continuous track and said second track; switching means operatively connected to said continuous track and said transition track for simultaneously connecting said continuous track to said transition track and opening said continuous track, a vehicle disposed for movement over said trackway, said continuous track having a trough adapted to contain water, and means carried by said vehicle and arranged for selective movement into the water of said trough to define a brake for said vehicle.

20. The space flight simulator as in claim 19 wherein said transition track is comprised of sections of varying radii and including a movable section at one end thereof adapted for connection with said continuous track, said switching mechanism operatively connected to said movable section for moving said section into and out of connective engagement with said continuous track.

21. A space flight simulator comprising a trackway having a continuous track lying in one plane, a second track disposed in a plane angularly related to said one plane, and an arcuate transition track connecting said continuous track and said second track; a vehicle disposed for movement over said trackway, said trackway including a first rail lying in a first plane and a second rail lying in a second plane spaced from and disposed normally to said first plane, a switching mechanism operative to connect and disconnect said first and second rails of the continuous track and the transition track, and means carried by said vehicle in operative engagement with said rails for maintaining said vehicle on said trackway, said continuous track being provided with a trough adapted to contain water, and means carried by said vehicle and arranged for selective movement into the water of said trough to define a brake for said vehicle on said continuous track.

22. The space flight simulator as in claim 21 wherein said first and second rails of the continuous and transition tracks have adjacent movable end sections operatively connected to said switching mechanism whereby said movable sections are displaced into and out of engagement upon actuation of said mechanism.

References Cited in the file of this patent

UNITED STATES PATENTS

| | | |
|---|---|---|
| 285,835 | Otis | Oct. 2, 1883 |
| 821,138 | Tidd | May 22, 1906 |
| 847,304 | Allen | Mar. 19, 1907 |
| 906,732 | McDonagh et al. | Dec. 15, 1908 |
| 1,074,185 | Lockwood | Sept. 30, 1913 |
| 1,422,764 | Irsch | July 11, 1922 |
| 1,811,758 | Meehan | June 23, 1931 |
| 1,961,997 | Bacon | June 5, 1934 |
| 1,981,678 | Staver | Nov. 20, 1934 |
| 2,128,492 | Mena | Aug. 30, 1938 |
| 2,173,703 | Witt | Sept. 19, 1939 |
| 2,199,333 | Dunklin | Apr. 30, 1940 |
| 2,392,722 | Burlin | Jan. 8, 1946 |
| 2,535,862 | Pewitt | Dec. 26, 1950 |
| 2,567,438 | McBride | Sept. 11, 1951 |
| 2,844,220 | Muehlner | July 22, 1958 |